US010333305B2

(12) United States Patent
Imai et al.

(10) Patent No.: US 10,333,305 B2
(45) Date of Patent: Jun. 25, 2019

(54) MANAGEMENT DEVICE, MANAGEMENT SYSTEM, CONTROL METHOD FOR MANAGEMENT DEVICE, AND CONTROL PROGRAM (71) Applicant: OMRON CORPORATION, Kyoto-shi, Kyoto (JP)

(72) Inventors: Hiroshi Imai, Nara (JP); Hiromasa Takatsuka, Tokyo (JP); Masayo Ikuta, Osaka (JP); Taiji Yoshikawa, Kizugawa (JP); Kazuki Kasai, Tokyo (JP)

(73) Assignee: OMRON CORPORATION, Kyoto-shi (JP)

( * ) Notice: Subject to any disclaimer, the term of this patent is extended or adjusted under 35 U.S.C. 154(b) by 0 days.

(21) Appl. No.: 15/550,916

(22) PCT Filed: Feb. 12, 2016

(86) PCT No.: PCT/JP2016/054084
§ 371 (c)(1),
(2) Date: Aug. 14, 2017

(87) PCT Pub. No.: WO2016/158027
PCT Pub. Date: Oct. 6, 2016

(65) Prior Publication Data
US 2018/0048153 A1 Feb. 15, 2018

(30) Foreign Application Priority Data

Mar. 30, 2015 (JP) ................................. 2015-070180

(51) Int. Cl.
*H02J 3/00* (2006.01)
*H02J 3/14* (2006.01)
(Continued)

(52) U.S. Cl.
CPC .............. *H02J 3/14* (2013.01); *G05B 19/042* (2013.01); *G06Q 50/06* (2013.01); *H02J 3/00* (2013.01);
(Continued)

(58) Field of Classification Search
None
See application file for complete search history.

(56) References Cited

U.S. PATENT DOCUMENTS 8,583,520 B1 * 11/2013 Forbes, Jr. ............. G05D 17/00
705/34
2013/0229059 A1   9/2013 Baba et al.
2016/0248251 A1 *  8/2016 Tinnakornsrisuphap ....................
H02J 3/14

FOREIGN PATENT DOCUMENTS

JP     2007-295680 A    11/2007
JP     2012-100427 A     5/2012
(Continued)

OTHER PUBLICATIONS

The translated International Search Report of PCT/JP2016/054084 dated Apr. 26, 2016.

*Primary Examiner* — Ryan A Jarrett
(74) *Attorney, Agent, or Firm* — Metrolexis Law Group, PLLC (57) ABSTRACT A management device includes a surplus power calculator configured to compute a measurement value or an estimated value for a surplus power which is power output from the power generator excluding the power consumption of the electrical appliance; and a scheduler configured to create an operation schedule for a designated appliance scheduled to operate during a period different from a surplus power period when the surplus power is available so that the designated appliance uses the surplus power during the surplus power period to operate; the scheduler also configured to shift the operation period of the designated appliance
(Continued)

when a potential usable power is greater than an increment in the power consumption resulting due to shifting the operation period of the designated appliance, where the potential usable power is the surplus power with a potential feed-in power excluded therefrom.

16 Claims, 7 Drawing Sheets

(51) Int. Cl.
    *H02J 3/38*     (2006.01)
    *G06Q 50/06*     (2012.01)
    *H02J 13/00*     (2006.01)
    *G05B 19/042*     (2006.01)

(52) U.S. Cl.
    CPC ...... *H02J 3/383* (2013.01); *G05B 2219/2642* (2013.01); *H02J 13/0075* (2013.01); *H02J 2003/143* (2013.01); *H02J 2003/146* (2013.01); *Y02B 70/3225* (2013.01); *Y02B 90/2653* (2013.01); *Y02E 10/563* (2013.01); *Y02E 40/72* (2013.01); *Y04S 10/123* (2013.01); *Y04S 20/222* (2013.01); *Y04S 20/224* (2013.01); *Y04S 40/126* (2013.01)

(56) References Cited

FOREIGN PATENT DOCUMENTS

| | | | |
|---|---|---|---|
| JP | 2014-187876 | A | 10/2014 |
| JP | 2014-197960 | A | 10/2014 |
| WO | 2015/072029 | A1 | 5/2015 |

\* cited by examiner

MANAGEMENT DEVICE, MANAGEMENT SYSTEM, CONTROL METHOD FOR MANAGEMENT DEVICE, AND CONTROL PROGRAM

FIELD

The present invention relates to a management device for managing a power generator and an electrical appliance, a management system, a control method for a management device, and a control program.

BACKGROUND

A growing number of factories and residences are installing solar power devices. Electrical appliances in the factory or the home may consume the energy generated by a solar power device with the remaining surplus energy sold back to the power company. This kind of solar power device requires a power control device that controls the supply of the energy generated by the solar power device.

While the power control device may supply the surplus energy to the power company's power grid, the surplus energy cannot be supplied to the grid, i.e., sold back to the power company when the voltage setting of the grid exceeds a certain value (set point) the surplus energy cannot be supplied to the grid. In this case, some or all the surplus energy is not used, but cannot be sold back to the grid, i.e., this creates potential usable energy.

Consequently, techniques for making this potential usable energy available have been disclosed. For instance, Patent Document 1 describes a power control device that terminates supply of surplus energy to the grid when the voltage setting of the grid exceeds a threshold, and modifying the operation of an electrical appliance so that the appliance consumes more power. Patent Document 2 also describes a power control device; the device controls supply to the grid and the charging and discharging of a battery to thereby ensure that the voltage setting of the grid remains at or below a predetermined threshold.

RELATED ART DOCUMENTS

Patent Documents

Patent Document 1: Japanese Patent Publication No. 2014-197960 (published 16 Oct. 2014)
Patent Document 2: Japanese Patent Publication No. 2014-187876 (published 2 Oct. 2014)

SUMMARY

Despite that in some instances the existing technologies described above fail to effectively take advantage of the surplus energy.

More specifically existing technologies merely operate the electrical appliance so that electrical appliance just consumes potential usable energy. As a result, operating the electrical appliance to use the potential usable energy may not necessarily provide a benefit to the consumer.

Embodiments of the present invention address the foregoing challenges by providing a management device, a control method for the management device, and a control program that effectively uses surplus energy.

To address the foregoing, a management device according to embodiments of the invention manages a power generator and an electrical appliance; the management device including: a surplus power calculator configured to compute a measurement value or an estimated value for a surplus power which is power output from the power generator excluding the power consumption of the electrical appliance; and a scheduler configured to create an operation schedule for a designated appliance scheduled to operate during a period different from a surplus power period when the surplus power is available so that the designated appliance uses the surplus power during the surplus power period to operate; the scheduler also configured to shift the operation period of the designated appliance when a potential usable power is greater than an increment in the power consumption resulting due to shifting the operation period of the designated appliance, where the potential usable power is the surplus power with a potential feed-in power excluded therefrom The aforementioned configuration reduces the power consumption during a period different from the surplus power period because the designated appliance scheduled to operate during a period different from a surplus power period uses the surplus energy during the surplus power period to operate. As a result, the total cost of the electricity rate decreases. The total cost of the electricity rate also decreases due to the shift in an operation period when the potential usable power is greater than an increment in the power consumption resulting due to shifting the operation period of the designated appliance. Consequently, the aforementioned configuration reliably decreases the total cost of the electricity rate. Accordingly, embodiments of the present invention are able to effectively use surplus energy. The aforementioned configuration also allows effective use of potential usable energy without introducing special devices such as storage batteries or the like (i.e., with less startup investment costs).

In a management device according the embodiments the surplus power calculator may compute an estimated value for the surplus power during a predetermined period by subtracting an estimated value for the power consumption during the predetermined period from an estimated value for the power output during the predetermined period.

With the aforementioned configuration, the potential usable power may be estimated by estimating the power output, the power consumption, and the potential feed-in amount.

In a management device according to the embodiments the surplus power calculator may compute a measurement value for the surplus power by subtracting a measurement value for the power consumption from a measurement value for the power output.

With the aforementioned configuration, the surplus power may be estimated by estimating the power output and the power consumption.

The management device according to the embodiments may further include a data acquisition unit configured to acquire power data from a meter, the power data representing a measurement value for at least any of the power output and the power consumption; and the surplus power calculator may update the estimated value for the potential usable power during the predetermined period on the basis of the power data.

According to the aforementioned configuration an estimated value for the surplus power may be updated on the basis of at least any of the measurement values for the power output and the power consumption measured by the meter. It is therefore possible to improve the accuracy of estimating the surplus power. Moreover, it is possible to more efficiently take advantage of the surplus energy.

The management device according to the embodiments may manage a plurality of designated appliances and establish a priority for each of the designated appliances in advance, and the scheduler may determine the operation schedule so that the designated appliances use the surplus power in descending order of priority.

The aforementioned configuration is more effective at reducing the total cost of the electricity rate when, for example, the priority is established in descending order of cost reduction effect.

In the management device according to the embodiments, the scheduler may select the power of the designated appliance to shift to minimize the value resulting from subtracting an electricity rate corresponding to the power of the designated appliance that may be shifted from the electricity rate for purchasing energy from the power grid, and adding the electricity rate corresponding to an increment in the power consumption resulting due to the shift and the electricity rate corresponding to a feed-in loss due to the shift to the electricity rate for purchasing energy from the power grid.

The aforementioned configuration more effectively reduces the total cost of the electricity rate because the scheduler selects the designated appliance whose power is to be shifted so that the total cost of the electricity rate is minimized.

In the management device according to the embodiments, the scheduler may select the power of the designated appliance to shift to minimize the value resulting from subtracting the power of the designated appliance that may be shifted from the power to be purchased from the power grid, and adding an increment in the power consumption resulting due to the shift to the power to be purchased from the power grid.

The aforementioned configuration more effectively reduces the total cost of the electricity rate because the scheduler selects the designated appliance whose power is to be shifted so that purchased amount is minimized.

The operation schedule in a management device according to the embodiments may further indicate at least an operation start time for the designated appliance.

The operation schedule in a management device according to the embodiments may further indicate an operation period for the designated appliance.

A management device according to the embodiments may further include an appliance controller configured to operate the designated appliance on the basis of the operation schedule.

The aforementioned configuration saves on electricity costs because the designated appliance is operated using the surplus energy. The appliance controller also operates the designated appliance automatically, eliminating the inconvenience to the consumer.

A management device according to the embodiments may at least one of the power generator and the electrical appliance owned by a plurality of consumers.

The scheduler in a management device according to the embodiments may determine which of the designated appliances in the plurality of electrical appliances owned by the plurality of consumers is to receive potential usable energy.

The scheduler in the management device according to the embodiments may select the designated appliances whose operation period is to be shifted taking into account a distribution loss that occurs when power is distributed via a distribution network interconnecting the plurality of consumers.

A management system according to the embodiments includes a management device as above described, said a power generator and said electrical appliance.

To address the foregoing, control method according to embodiments of the invention for a management device manages a power generator and an electrical appliance includes: computing a measurement value or an estimated value for a surplus power which is power output from the power generator excluding the power consumption of the electrical appliance; and creating an operation schedule for a designated appliance scheduled to operate during a period different from a surplus power period when the surplus power is available so that the designated appliance uses the surplus power during the surplus power period to operate; and during the schedule creation step shifting the operation period of the designated appliance when a potential usable power is greater than an increment in the power consumption resulting due to shifting the operation period of the designated appliance, where the potential usable power is the surplus power with a potential feed-in power excluded therefrom The aforementioned configuration provides the same effects as the aforementioned management device.

The embodiments of the management device according to the present invention may be implemented on a computer. In this case, a control program for a management device configured to cause a computer to function as a management device provided with each of the above components, and a computer readable medium whereupon said control program is stored are within the scope of the invention.

Effects

Embodiments of the present invention are able to effectively use surplus energy.

DETAILED DESCRIPTION

An embodiment of the present invention is described below on the basis of FIG. 1 through FIG. 6.

Management System

Figure 1:
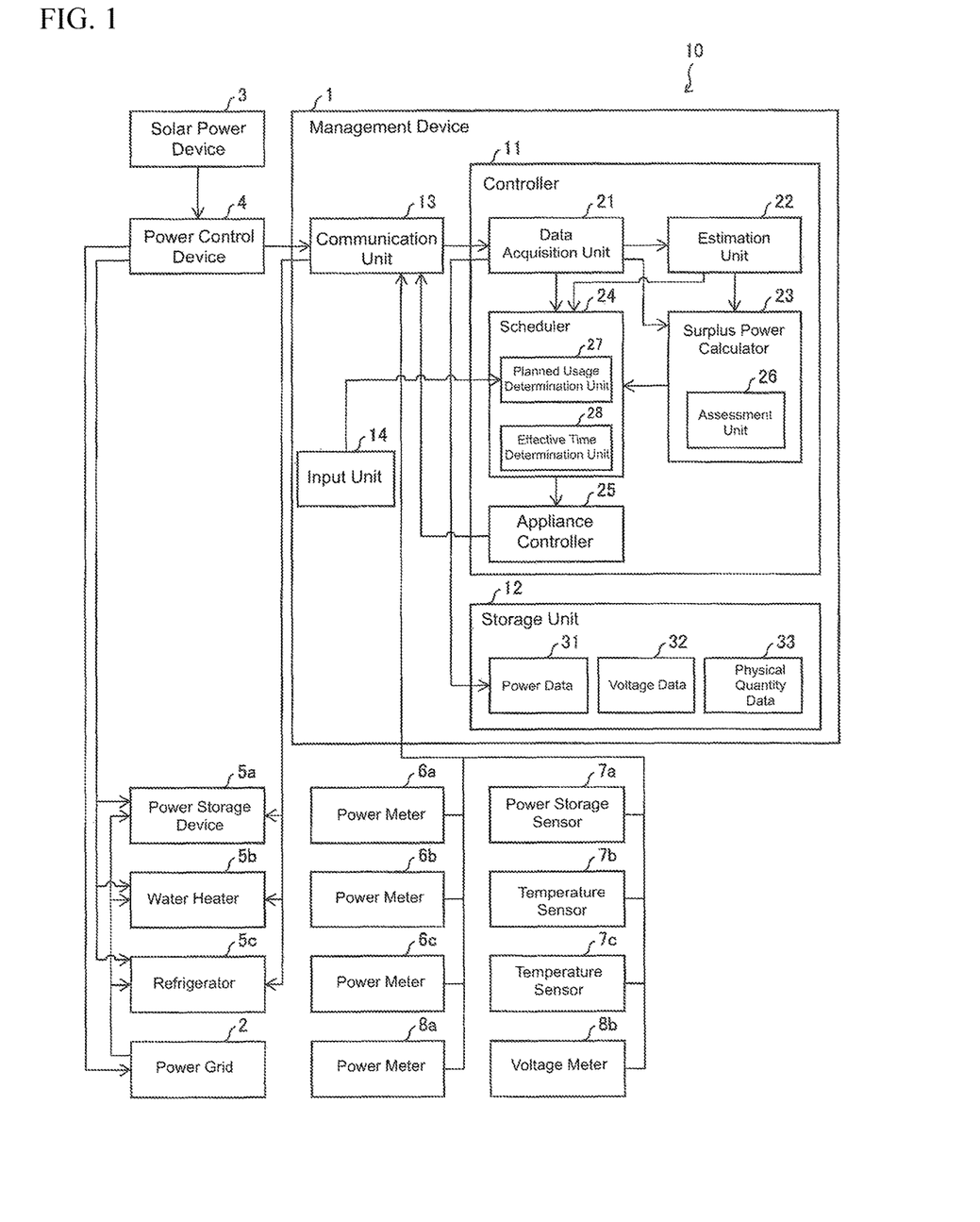
FIG. 1 is a block diagram illustrating an overview of a management system according to the present invention, and an example of the main components of a management device provided in the management system of the example.

An overview of a management system 10 according to the present invention is described on the basis of FIG. 1. FIG. 1 is a block diagram illustrating an overview of a management system 10 according to the present invention, and an example of the main components of a management device 1 provided in the management system 10; the management system 10 includes a management device 1, a power control device 4, and at least one meter. The term "meter" collectively refers to the power meters 6a-6c and 8a, as well as the power storage sensor 7a, the temperature sensor 7b, the temperature sensor 7c, and the voltage meter 8b.

The management device 1 controls a power generator and an electrical appliance installed on-site at consumer factories, homes, or the like. A detailed configuration of the management device 1 is described later.

In the example illustrated in FIG. 1, the management device 1 controls a solar power device 3 serving as the power generator, and a power storage device 5a, a water heater 5b, and a refrigerator 5c which are the appliances. However, the devices controlled by the management device 1 are not limited thereto. Instead of a solar power device 3 the management device 1 may control any other kind of power generating device such as a wind power generator, or a fuel cell, and may also control a plurality of power generating devices. The management device 1 may also control one or a plurality of electrical appliances and may control any electrical appliance that consumes energy to function.

The solar power device 3 converts solar energy to electrical power. The solar power device 3 supplies the energy it generates to the power control device 4.

The power control device 4 controls the energy generated by the solar power device 3 and is known as a power conditioner. The power control device 4 supplies an electrical appliance with the energy generated by the solar power device 3 to allow self consumption, and supplies the energy generated by the solar power device 3 to the power grid (reverse power flow) to sell power back to the power company. In addition, the power control device 4 sends the management device 1 data representing the amount of power generated by the solar power device 3 (power output); the amount of power supplied to the electrical appliance, and the amount of power supplied to the power grid (feed-in amount).

Although the management device 1 and the power control device 4 are separate in the example in FIG. 1, the management device 1 and the power control device 4 may be combined.

The power grid 2 is a system owned by the power company, and supplies an electrical appliance installed on-site at the consumer with energy. The power grid 2 is provided with a power meter 8a that measures the total amount of power supplied from the power grid 2 to the appliances (purchased amount) and a voltage meter 8b that measures the voltage of the power grid 2.

The power meter 8a sends to the management device 1 power data representing the purchased amount measured thereby. The voltage meter 8b sends to the management device 1 voltage data indicating the voltage setting the power grid 2 measured thereby.

The power storage device 5a converts the power supplied from the power grid 2 and the power control device 4 into chemical energy and stores the energy therein. The power storage device 5a also discharges the energy stored therein to other electrical appliances as needed. The water heater 5b uses the energy supplied from the power grid 2 and the power control device 4 to heat water. The refrigerator 5c uses the energy supplied from the power grid 2 and the power control device 4 to keep inside the refrigerator 5c at a predetermined temperature.

Each appliance is provided with power meter for measuring the amount of power that the appliance used (power consumed), and a physical quantity sensor for measuring a physical quantity indicating the state of the appliance. More specifically, the power storage device 5a is provided with a power meter 6a that measures the amount of power consumed in order to store power (energy conversion), and a power storage sensor 7a that measures the amount of energy stored in the power storage device 5a (power stored). The water heater 5b is provided with a power meter 6b that measures the amount of power consumed by the water heater 5b, and a temperature sensor 7b that measures the temperature of the water heated by the water heater 5b. The refrigerator 5c is provided with a power meter 6c for measuring the amount of power consumed by the refrigerator 5c, and a temperature sensor 7c for measuring the temperature inside the refrigerator 5c.

Each of the power meters 6a-6c sends the management device 1 power data representing the power consumption measured thereby. The power storage sensor 7a, the temperature sensor 7b, and the temperature sensor 7c each sends the management device 1 physical quantity data indicating the amount of power stored and the temperature respectively measured thereby.

Overview of the Invention

Figure 2:
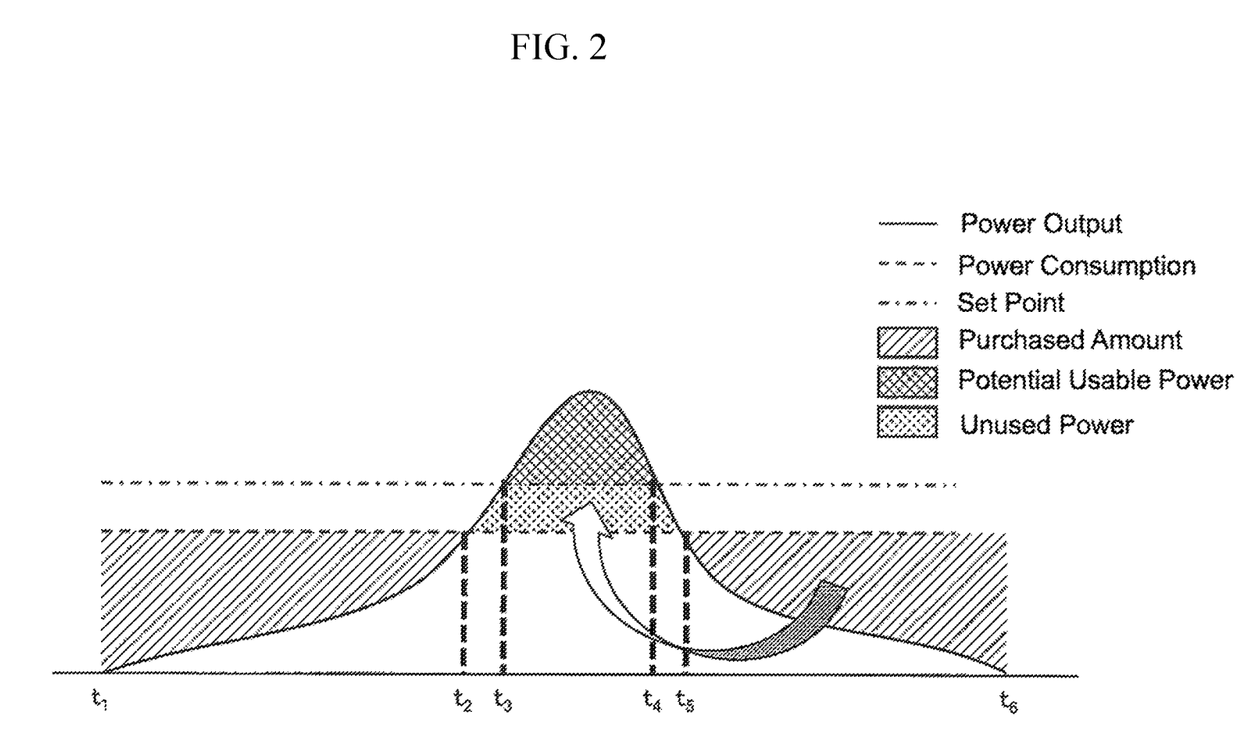
FIG. 2 illustrates the relationship between a power output, power consumption, and purchased amount.

An overview of the present invention is described on the basis of FIG. 2. FIG. 2 illustrates the relationship between a power output, power consumption, and purchased amount for a certain period (e.g., one day).

As illustrated in FIG. 2, electricity is purchased from the power grid 2 to cover power consumption between the time t1 to time t2 and the time t5 to time t6 since the power consumption is greater than the power output. Excess electricity is sold to the power grid 2 between the time t2 to time t5, since the power output is greater than the power consumption. However, a set point is established as a threshold for the voltage of the power grid 2; energy cannot flow back into the power grid 2 when the voltage of the power grid 2 equals or exceeds the set point. That is, there is an upper limit value to the amount of power that may be sold (potential feed-in amount). Consequently, this leads to potential usable energy between the time t3 to time t4, which cannot be consumed or sold since the power output is greater than or equal to the total of the self-consumed power (below, the total power consumption for normal appliances) and a potential feed-in amount. Note that surplus energy refers to the energy output minus self-consumed energy, and unused energy refers to surplus energy minus potential usable energy.

Embodiments of the present invention address effective use of this surplus energy. More specifically, embodiments of the present invention compute a surplus power, and determine an operation schedule for a designated appliance that allows the designated appliance to operate using a potential usable power calculated. Moreover, embodiments of the present invention further determine an operation schedule such that a designated appliance scheduled to operate at a different period (e.g., time t1 to time t2 and time t5 to time t6 in FIG. 2) from a surplus power period where surplus power becomes available (e.g., time t2 to time t5 in FIG. 2) operates during the surplus power period. Thus, less power may be consumed outside the surplus power period. Accordingly, the purchased amount from the power grid 2 decreases, and the total cost of electricity decreases. Embodiments of the present invention also allow effective use of potential usable energy without introducing special devices such as storage batteries or the like (i.e., with less startup investment costs).

Here a designated appliance is an electrical appliance that operates by consuming the surplus energy. Additionally, an electrical appliance a consumer operates as normal with no surplus energy available is referred to as a normal appliance. A designated appliance may be a normal appliance.

Note that while the aforementioned set point is a constant value, the voltage setting of the power grid 2 may fluctuate in accordance with, for instance, the purchased amount and feed-in amount from each of the consumers supplied energy by the power grid 2. That is, the potential feed-in amount is the amount of power corresponding to the voltage setting (i.e., the set point); however, the potential feed-in amount fluctuates in accordance with the purchased amount and the feed-in amount of each consumer.

Management Device Configuration

As illustrated in FIG. 1, the management device 1 is provided with a controller 11, a storage unit 12, and a communication unit 13. The management device 1 may also be provided with a display unit, an input unit, a voice input unit, a voice output unit or the like; however, these components are not illustrated as the same are unrelated to the features of the invention.

The communication unit 13 allows communication with other devices such as the power control device 4, the meters, and the like via wired or wireless communication, and exchanges data in accordance with commands from the controller 11. For instance, the communication unit 13 acquires power data, voltage data, and physical quantity data from the power control device 4 and the meters in accordance with commands from the controller 11.

The controller 11 temporarily reads a program from the storage unit 12 into a temporary storage unit (not shown) and runs the program to thereby execute various computations, and provide overall control of all the components in the management device 1.

In the embodiment the controller 11 includes a data acquisition unit 21, an estimation unit 22, a surplus power calculator 23, a scheduler 24, and an appliance controller 25 which are provided as function blocks therein. The function blocks in the controller 11 may be realized by a central processing unit (CPU) reading a program stored on a storage device implemented with a read-only memory (ROM) into a temporary storage unit implemented with a random-access memory (RAM), and running the program.

The data acquisition unit 21 acquires power data, voltage data, and physical quantity data from the power control device 4 and the meters through the communication unit 13. The data acquisition unit 21 outputs the power data, voltage data, and physical quantity data obtained thereby to the estimation unit 22 and the surplus power calculator 23. The data acquisition unit 21 also stores the power data, voltage data, and physical quantity data obtained in the storage unit 12.

The estimation unit 22 estimates the power output generated by the solar power device 3 and the total power consumption of the normal appliances. The estimation unit 22 outputs the estimated values for the power output and the total power consumption to the surplus power calculator 23. The estimation unit 22 may also estimate a purchased amount, and output the estimated purchased amount to the scheduler 24.

Here the predetermined period may be any period such as 30 minutes, one hour, one day, or the like; or a period counted from the latest time.

The estimation unit 22 estimates the power output generated by the solar power device 3 within the predetermined period on the basis of, for instance, weather information indicating the temperature, humidity, atmospheric pressure, solar irradiance, and the like during that predetermined period. The estimation unit 22 may also estimate the power output generated by the solar power device 3 within a predetermined period on the basis of past or most recent power output or weather information. The estimation unit 22 may also estimate the power output generated by the solar power device 3 during a predetermined period on the basis of panel temperature in the solar power device 3, a physical quantity indicating the state of the solar power device 3, or a rated value for the solar power device 3. Finally, the estimation unit 22 may estimate the power output through a combination of the aforementioned criteria. In this case, for instance, the data acquisition unit 21 may acquire weather information from an external device (not shown) connected to the Internet via the communication unit 13, acquire physical quantity data from a physical quantity sensor (not shown) installed at the solar power device 3, and store the weather information and the physical quantity data in the storage unit 12.

The estimation unit 22 may also estimate a total power consumption for the normal appliances during a predetermined period on the basis of, for instance, past or most recent power consumption by the normal appliances. Here, the total power consumption estimated by the estimation unit 22 does not include the power consumption of a designated appliance. That is, the estimation unit 22 estimates the total power consumption as the total power consumption of the electrical appliances regularly operated by the consumer with no surplus energy available. Therefore, the past or most recent power consumption data referenced by the estimation unit 22 is the power consumption data for normal appliances and does not include the power consumption of a designated appliance.

The estimation unit 22 may also estimate the amount of power that may be sold (potential feed-in amount). More specifically, the estimation unit 22 may estimate a potential feed-in amount during a predetermined period on the basis of, for instance, estimated values for the power output and the total power consumption during the predetermined period, as well as a set point.

The management device 1 is not limited to being provided with the estimation unit 22 in the embodiment. For instance, the power control device 4 or another device on the Internet may estimate the power output, the total power consumption, the purchased amount, the potential feed-in amount, and the like. In this case, the data acquisition unit 21 may acquire an estimated value for the power output, the total power consumption, the purchased amount, the potential feed-in amount, and the like from the power control device 4 or the other device on the Internet via the communication unit 13. Additionally, when there is plurality of management devices 1, a first management device 1 may estimate values for the power output, the total power consumption, the purchased amount, the potential feed-in amount, or the like, and a second management device 1 may obtain the estimated values from said first management device 1.

The surplus power calculator 23 computes a measurement value or an estimated value for the surplus power; here the surplus power is the amount of power remaining after excluding the total power consumption of the normal appliances from the power output generated by the solar power device 3. The surplus power calculator 23 outputs the measurement value or estimated value for the surplus power computed thereby to the scheduler 24.

More specifically the surplus power calculator 23 computes an estimated value for the surplus power during a predetermined period by subtracting the estimated value for the total power consumption during the predetermined period from the estimated value for the power output during the predetermined period. The surplus power calculator 23 may also compute a measurement value for the surplus power by subtracting a measurement value for the total power consumption from a measurement value for the power output.

The surplus power calculator 23 may also identify a surplus power period, i.e., a period when surplus energy becomes available. The surplus power calculator 23 may also identify a time-to-set-point which is the time the power output reaches power corresponding to the set point.

The surplus power calculator 23 may update an estimated value previously computed for the surplus power during a predetermined period, on the basis of at least any of the measurement values for power output and the total power consumption.

As illustrated in FIG. 1, the surplus power calculator 23 is provided with an assessment unit 26. The assessment unit 26 determines whether or not the difference between the most recent estimated value for the surplus power computed by the surplus power calculator 23 and the most recent measurement value for the surplus power is greater than or equal to a predetermined value. The surplus power calculator 23 updates subsequent estimated values for the surplus power when the assessment unit 26 determines that the difference is greater than or equal to a predetermined value.

The surplus power calculator 23 may compute a measurement value or an estimated value for the potential usable power; here the potential usable power is the amount of power remaining after excluding the total power consumption of the normal appliances and the potential feed-in amount from the power output generated by the solar power device 3. The surplus power calculator 23 may also identify a potential usable power period, i.e., a period when potential usable energy becomes available.

The management device 1 is not limited to being provided with a surplus power calculator 23 in the embodiment. For example, the power control device 4 or another device on the Internet may compute the surplus power. In this case, the data acquisition unit 21 may obtain the surplus power from the power control device 4 or another device on the Internet via the communication unit 13. In addition, when there is a plurality of management devices 1, a first management device may calculate the surplus power, and a second management device 1 may obtain the surplus power computed from said first management device 1.

The scheduler 24 may determine an operation schedule for a designated appliance so that one or a plurality of designated appliances may be operated using the surplus power or the potential usable power. More specifically, the scheduler 24 determines the operation schedule so that a designated appliance scheduled to operate at a different period from a surplus power period where surplus power is available (or a potential usable power period where potential usable power is available) operates during the surplus power period (or the potential usable power period). The scheduler 24 outputs the operation schedule determined thereby to an appliance controller 25.

The scheduler 24 may shift the operation period of a designated appliance if the potential usable power is greater than an increment in the power consumption (power loss) resulting due to shifting the operation period of the designated appliance, where the potential usable power is the surplus power with the potential feed-in power excluded therefrom.

The scheduler 24 may also shift the operation period of a designated appliance when the power consumption of a designated appliance scheduled to operate during a period different from the surplus power period (the power from shifting the operation period; shifted power) is greater than the potential usable power and the potential usable power is greater than the power loss. The scheduler 24 may also shift the operation schedule of a designated appliance when the shifted power is less than the potential usable power and the shifted power is greater than the power loss.

The conditions for determining whether or not to shift an operation period are described in detail below. Usually, when all unused energy is sold and the selling price equals the power purchase price, the value $B_0$ resulting from subtracting the energy purchased Ptotal from the unused power Pn is a gain. In other words, the gain $B_0$ from implementing existing techniques may be expressed as the following Equation 1.

Equation 1

$$B_0 = P_n - P_{total} \quad (1)$$

In contrast, the gain $B_1$ on implementing embodiments of the present invention may be expressed as the following Equation 2. More specifically, first the potential usable power Pr covers the shifted power Pb. The power that cannot be covered by the potential usable power Pr, is further covered by the unused power Pn. In other words, the first term of the Equation 2 represents the unused power Pn remaining when the energy is shifted. Furthermore, as illustrated by the second term in Equation 2, the net purchased amount is calculated by subtracting the shifted power Pb from the purchased amount Ptotal where there is no energy shift and adding that result to the power loss Plost. Therefore, subtracting the net purchase amount from the remaining unused power Pn yields the gain $B_1$.

Equation 2

$$B_1 = (P_n - (P_b - P_r)) - (P_{total} - P_b + P_{lost}) \quad (2)$$

Here, the aim must be for the gain $B_1$ that results from implementing the embodiment to be greater than the gain $B_0$ from implementing existing methods. Consequently, the conditional expression in Equation (3) below results in the conditional expression in Equation (4)

Equation 3

$$B_1 - B_0 > 0 \quad (3)$$

Equation 4

$$P_r < P_{lost} \quad (4)$$

As illustrated by Equation 4, the embodiments of the present invention should be implemented when the potential usable power Pr is greater than the power loss Plost. However, Equation 2 represents the case where the shifted energy Pb is greater than the potential usable power Pr. Given that the potential usable power Pr can cover all the shifted energy Pb if the shifted energy Pb is less than the potential usable power Pr, then the gain $B_1$ on implementing the present invention can be expressed in the following Equation (5).

Equation 5

$$B_1 = P_n - (P_{total} - P_b + P_{lost}) \quad (5)$$

Introducing Equation 1 and Equation 5 into Equation 3 yields Equation 6.

Equation 6

$$P_b > P_{lost} \quad (6)$$

In other words, Equation 6 indicates that the shifted energy Pb must be greater than the power loss Plost as a necessary condition for implementing embodiments of the present invention while the shifted energy Pb is less than or equal to the potential usable power Pr.

Note that the above Equations 1 through 6 assume that the selling price and the power purchase price are equivalent; therefore, when the prices are not equal, the conditional expressions in the equations may be computed while taking into account the respective prices.

The management device 1 may manage a plurality of designated appliances and establish a priority for each of the designated appliances in advance. In this case the scheduler 24 may determine the operation schedule so that the designated appliances use the surplus power (or the potential usable power) in descending order of priority. In other words, the scheduler 24 determines the amount of power that will be consumed by the designated appliances in descending order of priority and creates an operation schedule that maximizes the usage rate for the surplus power (or the potential usable power).

The scheduler 24 may select the power of the designated appliance to shift to minimize the value resulting from subtracting an electricity rate corresponding to the power of the designated appliance that may be shifted from the electricity rate for purchasing energy from the power grid 2, and adding the electricity rate corresponding to an increment in the power consumption resulting due to the shift and the electricity rate corresponding to a feed-in loss due to the shift to the electricity rate for purchasing energy from the power grid 2. The scheduler 24 may select the power of the designated appliance to shift to minimize the value resulting from subtracting the power of the designated appliance that may be shifted from the power to be purchased from the power grid 2, and adding an increment in the power consumption resulting due to the shift to the power to be purchased from the power grid 2.

However, identical effects may not be obtained in some cases when the operation period of the electrical appliance shifts even when the same energy is consumed. More specifically, the power storage device 5a discharges naturally over time. Therefore, front-loading the operation period would require excess energy to be stored to obtain the same effect (i.e., amount of energy stored) as operating on schedule, and would thus require additional energy. This additional consumption of energy is what is previously referred to as "an increment in the power consumption (power loss) resulting due to the shift". This power loss is preferably on the low side. For instance, a low power loss would result from a low self-discharge value for a power storage device 5a, a low natural radiation value for a water heater 5b, and a low cooling loss for a refrigerator 5c. The loss of benefits over time is also preferably low for electrical appliances that will be used immediately.

Note that the feed-in loss is the surplus energy (unused energy) that cannot be sold due to shifting and operation period and the resulting energy consumed by the designated instrument.

The scheduler 24 may determine an operation schedule indicating at least an operation start time for a designated appliance. The scheduler 24 determines an operation schedule that indicates at least any of an operation end time for the designated appliance, and operation period, and an output rate for the designated appliance in addition to the operation start time. For instance, if the designated appliance were a water heater, then the output rate would be the temperature of the water heated by the water heater; if the designated appliance were an air conditioner, then the output rate would be the temperature setting for the air conditioner.

The scheduler 24 may also instructs the appliance controller 25 to suspend operation of an electrical appliance outside the scheduled surplus power period (or outside the scheduled potential usable power period) on shifting the operation period for the electrical appliance.

The management device 1 is not limited to being provided with the scheduler 24 in the embodiment. For example, the power control device 4 or another device on the Internet may determine the operation schedule. In this case, the data acquisition unit 21 may obtain the operation schedule from the power control device 4 or another device on the Internet via the communication unit 13. In addition, when there is a plurality of management devices 1, a first management device may determine an operation schedule, and a second management device 1 may obtain the operation schedule determined from said first management device 1.

The appliance controller 25 may operates the designated appliance on the basis of the operation schedule. More specifically, the appliance controller 25 transmits a control signal via the communication unit 13 to the designated appliance; the control signal controls the operation start, the operation termination, and the output rate of the designated appliance.

The appliance controller 25 may also control an electrical appliance with a shifted operation period to suspend the scheduled operation of the electrical appliance outside of a scheduled surplus power period (or outside of a scheduled potential usable power period) on the basis of an instruction from the scheduler 24.

The storage unit 12 stores programs or data referenced by the controller 11; for example, the storage unit 12 may store power data 31, voltage data 32, physical quantity data 33, and the like. Thus, past power output, power consumption, purchased amount, feed-in amount, and the voltage setting of the power grid 2, as well as physical quantities related to the appliances and the like may be stored in the storage unit 12 as power data 31, voltage data 32, and physical quantity data 33. Therefore, the estimation unit 22, surplus power calculator 23, and the scheduler 24 may reference this data.

Processes in the Management Device

Determining the Operation Schedule (First Example)

Figure 3:
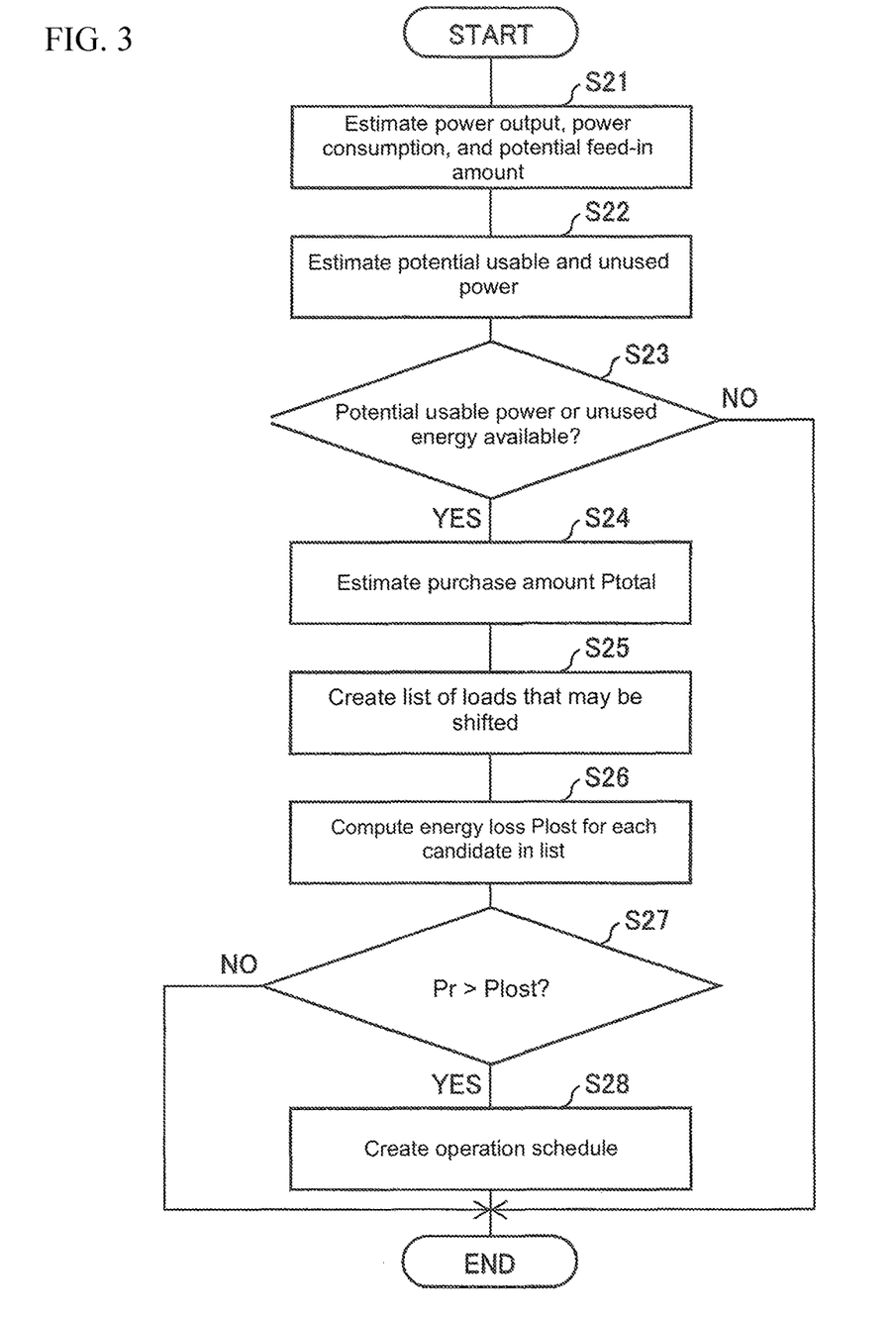
FIG. 3 is a flowchart illustrating an example of an operation schedule determination process run by the management device.

A first example of the process of determining an operation schedule carried out by the management device 1 according to the first embodiment is described on the basis of FIG. 3. FIG. 3 is a flowchart illustrating an example of an operation schedule determination process run by the management device 1. In this example, the surplus energy available during a predetermined period (e.g., one day) is estimated and an operation schedule determined in advance for the surplus power period.

As illustrated in FIG. 3, the estimation unit 22 estimates the power output, the total power consumption, and the potential feed-in amount during the predetermined period (S21). The surplus power calculator 23 estimates the potential usable power and the unused power (or surplus energy) during the predetermined period on the basis of the estimated values for the power output, the total power consumption, and the potential feed-in amount determined by the estimation unit 22 (S22: surplus power computation step).

Here, if potential usable energy or unused energy (or surplus energy) is available (YES at S23), the estimation unit 22 estimates the purchase amount Ptotal during the predetermined period from the power output and the total power consumption estimated (S24). The scheduler 24 creates a list of loads that may be shifted from the energy scheduled for consumption outside the potential usable power period or outside the surplus power period (S25). That is, the scheduler 24 creates a list of electrical appliances whose operation periods may be shifted from the normal appliances scheduled to operate outside the potential usable power period or outside the surplus power period. The scheduler 24 computes an increment in the power consumption (power loss Plost) that may result due to the shift for each of the candidates in the list (S26).

The scheduler 24 may also determine whether or not the potentially usable power Pr is greater than the power loss Plost for each of the candidates in the list. The scheduler 24 selects a normal appliance from the list where the potential usable power Pr is greater than the power loss Plost as a designated appliance that will operate using potential usable energy or surplus energy, and creates an operation schedule for the designated appliance during a potential usable power period or a surplus power period (S28: schedule creation step).

Note that if no instance of potential usable energy or unused energy (or surplus energy) is available (NO at S23), the management device 1 does not create an operation schedule and ends the operation schedule determination process. In addition, if the potential usable power Pr is greater than the power loss Plost for none of the normal appliances in the list, then in S27 the management device 1 does not create an operation schedule and ends the operation scheduled termination process.

Determining the Operation Schedule (Second Example)

Figure 4:
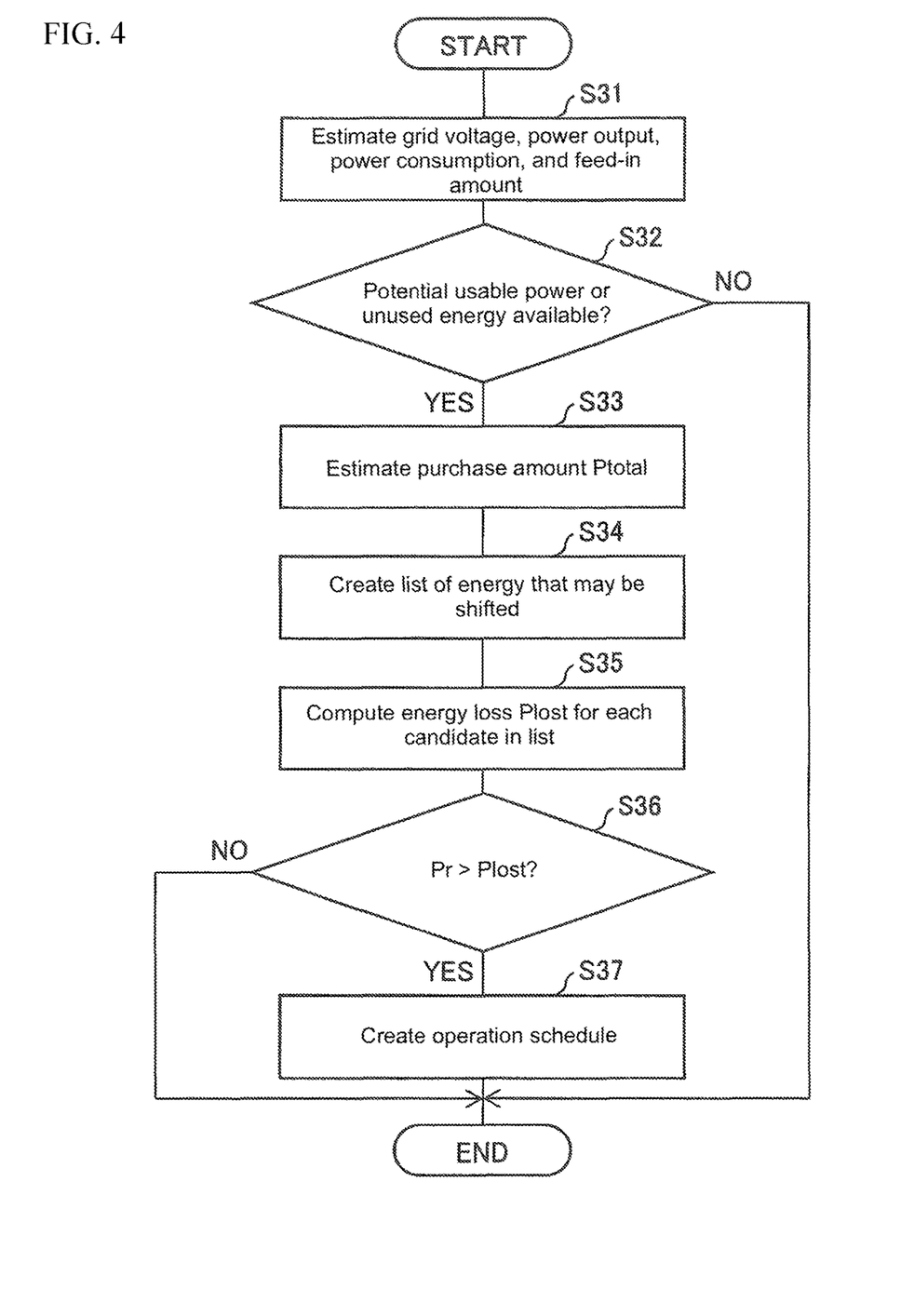
FIG. 4 is a flowchart illustrating another example of an operation schedule determination process run by the management device.

A second example of the process of determining an operation schedule carried out by the management device 1 is described on the basis of FIG. 4. FIG. 4 is a flowchart illustrating another example of an operation schedule determination process run by the management device 1. The second example differs from the first example in that the measurement values for the potential usable power and the surplus power are computed.

As illustrated in FIG. 4, the data acquisition unit 21 acquires voltage data indicating the most recent voltage setting on the power grid, as well as power data representing the latest power output, power consumption, and feed-in amount (S31). The surplus power calculator 23 calculates the most recent measurement value for the potential usable power or the surplus power on the basis of data representing the most recent measurement value obtained by the data acquisition unit 21 (surplus power calculation step).

Here, if potential usable energy or unused energy (or surplus energy) is available (YES at S23), the estimation unit 22 estimates the purchase amount Ptotal during the predetermined period on the basis of data representing the most recent measurement values acquired by the data acquisition unit 21 (S33). The scheduler 24 creates a list of loads that may be shifted from the energy scheduled for consumption outside the potential usable power period or outside the surplus power period (S34). That is, the scheduler 24 creates a list of electrical appliances whose operation periods may be shifted from the normal appliances scheduled to operate outside the potential usable power period or outside the surplus power period. The scheduler 24 computes an increment in the power consumption (power loss Plost) that may result due to the shift for each of the candidates in the list (S35).

The scheduler 24 may also determine whether or not the potentially usable power Pr is greater than the power loss Plost for each of the candidates in the list. The scheduler 24 selects a normal appliance from the list where the potential usable power Pr is greater than the power loss Plost as a designated appliance that will operate using potential usable energy or surplus energy, and creates an operation schedule for the designated appliance during a potential usable power period or a surplus power period (S37: schedule creation step).

Note that if no instance of potential usable energy or unused energy (or surplus energy) is available (NO at S32), the management device 1 does not create an operation schedule and ends the operation schedule determination process. Additionally, if the potential usable power Pr is greater than the power loss Plost for none of the normal appliances in the list, then in S27 the management device 1 does not create an operation schedule and ends the operation scheduled termination process.

Determining the Operation Schedule (Third Example)

Figure 5:
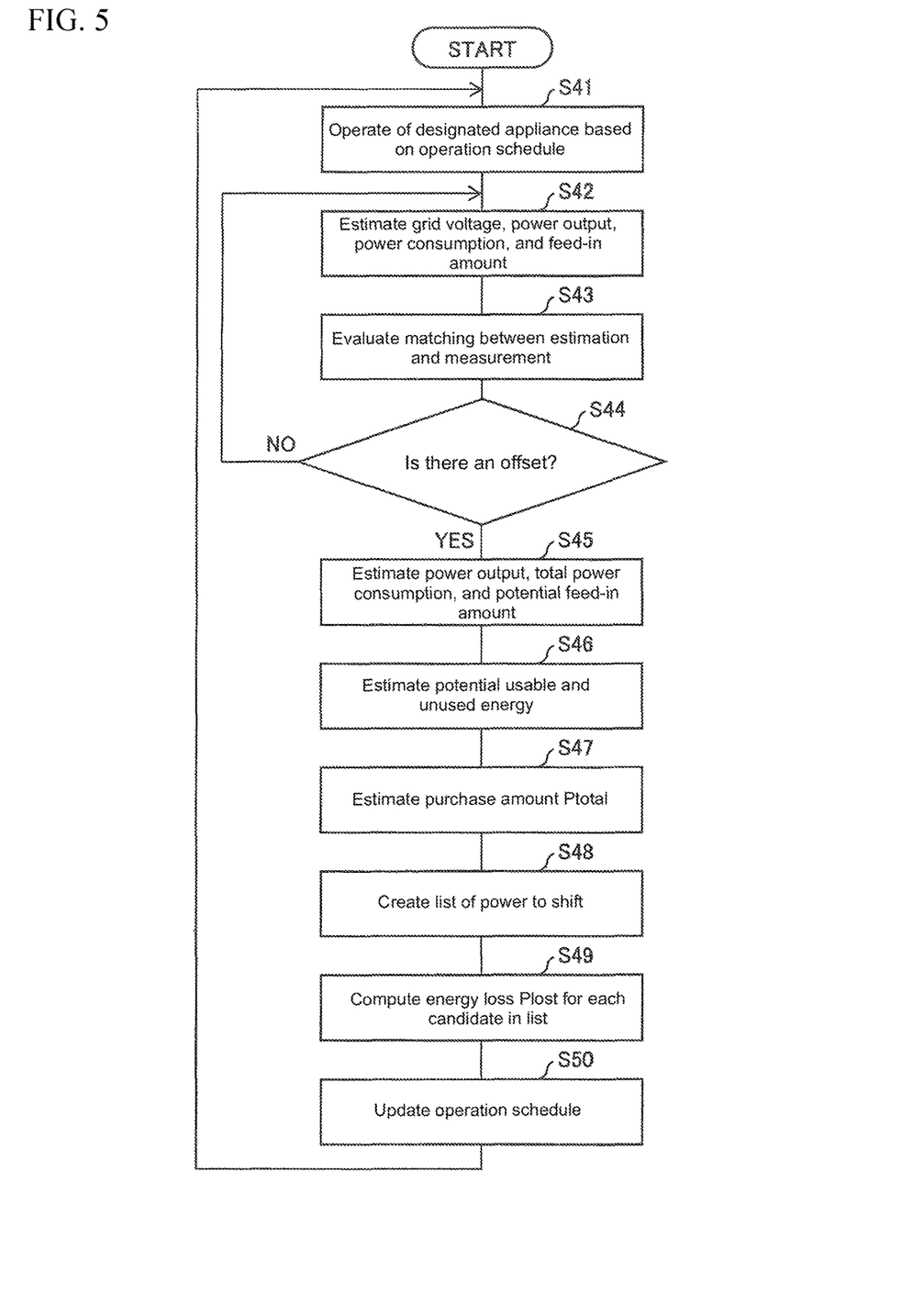
FIG. 5 is a flowchart illustrating an example of the operation schedule updating process run by the management device.

A third example of the process of determining an operation schedule carried out by the management device 1 is described on the basis of FIG. 5. FIG. 5 is a flowchart illustrating an example of an operation schedule updating process run by the management device 1; in this example the management device updates the operation schedule in real time while the designated appliance is operating.

As illustrated in FIG. 5, the appliance controller 25 operates the designated appliance on the basis of an operation schedule created in advance by the scheduler 24 (S41). At this point, the data acquisition unit 21 acquires voltage data indicating the most recent voltage setting on the power grid, as well as power data representing the latest power output, power consumption, and feed-in amount (S42). The surplus power calculator 23 calculates the most recent measurement value for the potential usable power or the surplus power on the basis of data representing the most recent measurement value obtained by the data acquisition unit 21. The assessment unit 26 calculates the difference between the estimated value for the potential usable power or the surplus power calculated for this period in advance, and the most recent measurement value for the potential usable power or the surplus power (S43).

The flow returns to S42 if the difference calculated by the assessment unit 26 is below a predetermined value (NO at S44).

In contrast, if the difference calculated by the assessment unit 26 is greater than or equal to the predetermined value (YES at S44), i.e., if there is an offset between the estimated value and the measurement value, the estimation unit 22 takes into account the most recent measurement values for the power output, total power consumption, and potential feed-in amount to estimate a power output, a total power consumption, and a potential feed-in amount (S45). The surplus power calculator 23 estimates the potential usable power and the unused power (or surplus energy) on the basis of the estimated values for the power output, the total power consumption, and the potential feed-in amount determined by the estimation unit 22 (S46).

The estimation unit 22 estimates the purchase amount Ptotal during the predetermined period on the basis of data representing the most recent measurement value acquired by the data acquisition unit 21 (S47). The scheduler 24 creates a list of loads that may be shifted from the energy scheduled for consumption outside the potential usable power period or outside the surplus power period (S48). The scheduler 24 computes an increment in the power consumption (power loss Plost) that may result due to the shift for each of the candidates in the list (S35).

The scheduler 24 may also determine whether or not the potentially usable power Pr is greater than the power loss Plost for each of the candidates in the list. The scheduler 24 selects a normal appliance from the list where the potential usable power Pr is greater than the power loss Plost as a designated appliance that will operate using potential usable energy or surplus energy, and creates an operation schedule for the designated appliance during a potential usable power period or a surplus power period and updates a previously created operation schedule (S50).

The appliance controller 25 operates the designated appliance on the basis of the operation schedule updated by the scheduler 24 (S41).

Determining the Operation Schedule (Fourth Example)

As illustrated in FIG. 2, the operation period for an electrical appliance is preferably shifted to minimize the purchase amount Ptotal. Thus, expressing the purchase amount Ptotal as a function of the time shift value for each power demand (power consumption of an electrical appliance) yields the following Equation 7.

Equation 7

$$P_{total} = f(T) = \min_T \left\{ s(t) - \sum_i d_i(t + \tau_i) + c_i(t + \tau_i) \right\} \quad (7)$$

As indicated by the following Equation 8, T is a matrix of time shift values for each power demand. The first term on the right side of Equation 7 is a function of the potential usable energy; the second term on the right side is a function of a power demand i. The third term on the right side is a function representing the complexity of shifting the time of a power demand. The variable t represents time. Additionally, i is a value from 1 to n, and n is the number of individual power demands.

Equation 8

$$T = \begin{bmatrix} \tau_1 \\ \tau_2 \\ \tau_3 \\ \vdots \end{bmatrix} \quad (8)$$

Ideally, the above Equation 7 would be used to solve for T, however, the function is a closed form and cannot be solved because the function f(T) is non-linear with respect to T. Therefore, the above Equation is computed via linear approximation or non-linear optimization. The method of establishing a priority for an electrical appliance and performing a full search in order of priority to calculate T serves to describe the methods used in the fourth example.

Equation 7 may be approximated as illustrated by the following Equation 9.

Equation 9

$$P_{total} = \quad (9)$$
$$f(T) = \min_T \left\{ s(t) - \sum_i d_i(t + \tau_i) + c_i(t + \tau_i) \right\} \approx \sum_i \min_{\tau_i} (f_i(\tau_i; T_{i-1}))$$

The right side of Equation 9 may be expressed as the following Equation 10. The first term on the right side of Equation 10 represents up to the (i−1)th power demand, and the second term on the right side represents the i-th power demand.

Equation 10

$$\min_{\tau_i}(f_i(\tau_i; T_{i-1})) = \quad (10)$$
$$\min_{\tau_i} \left\{ \left[ s(t) - \sum_j^{i-1} d_j(t + \tau_j^*) + c_j(t + \tau_j^*) \right] - [d_i(t + \tau_i) + c_i(t + \tau_i)] \right\}$$

In this example, optimization is performed on the basis of Equation 10 starting at i=1. More specifically, the optimal time shift value τi for the (i−1)th power demand is computed assuming that the time shift values T(τi to τi−1) up to the (i−1)th power demand are known. An optimum time shift amount τi may be obtained by, for instance, searching the all time shift values τ in one minute increments to obtain τi providing the smallest fi.

Figure 6:
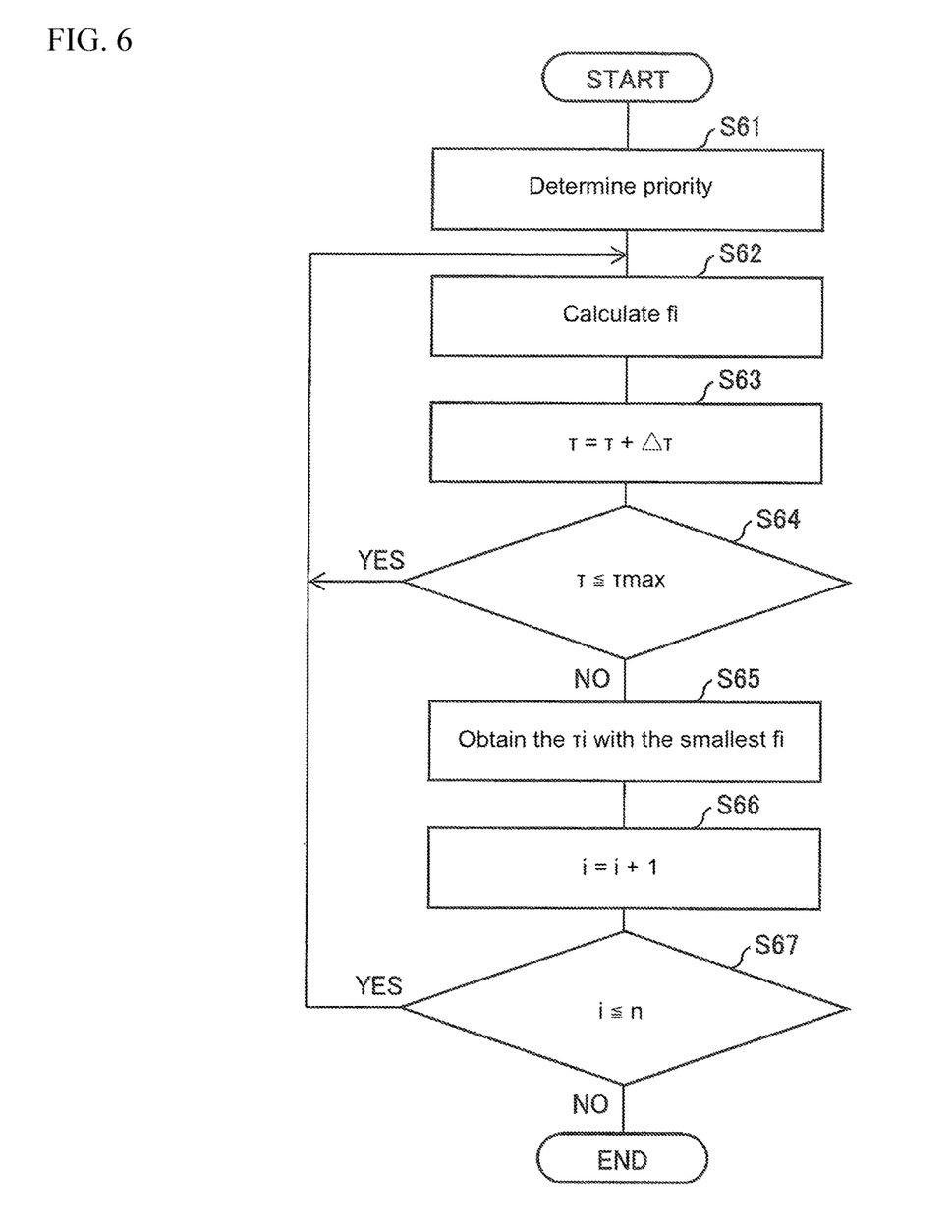
FIG. 6 is a flowchart illustrating an example of successively computing an optimal value in order of priority.

This method of iterating optimal value in order of priority is described on the basis of FIG. 6. FIG. 6 is a flowchart illustrating an example of successively computing an optimal value in order of priority.

As illustrated in FIG. 6, the scheduler 24 establishes a priority for a power demand d (an electrical appliance) (S61). The scheduler 24 may determine the priority on the basis of the amount of power (integral value), the complexity of shifting the operation period (slope of the time shift function) or the like.

The scheduler 24 calculates fi from i=1 and τ=0. After the calculations are complete, the scheduler 24 sets τ=τ+Δτ. Here, Δτ is the search increment described above, and may be one minute. The scheduler 24 determines whether or not τ is less than or equal to τ max. If τ is less than or equal to τ max (NO at S64), the scheduler 24 returns to S62 and calculates fi. The scheduler 24 thus calculates fi from until τ equals τ max. Here, τ max is the search range, and for instance, may be set to 1440 minutes.

Once calculations are complete for the entire search range (YES at S64), the scheduler 24 selects from all the fi calculated, the τ having the smallest fi as τi. The scheduler 24 then sets i=i+1 (S66). The scheduler 24 determines whether or not i is less than or equal to n (S67). If i is less than or equal to n (YES at S67), the scheduler 24 returns to S62 and calculates fi.

In contrast, if τi is calculated for all power demand (NO at S67), the scheduler 24 ends the process.

After ending the processing illustrated in FIG. 6, the scheduler 24 creates an operation schedule for each electrical appliance on the basis of the τi computed for the electrical appliances.

Example of Implementation in Software

The control block (and in particular the controller 11) in the management device 1 may be implemented as logic circuits (hardware) created on an integrated circuit (IC chip) or the like, or maybe implemented in software by using a CPU.

When implemented in software, the management device 1 is provided with, for instance, a CPU that runs commands in a program that is software implementing each of the functions; a ROM or a storage device (referred to as recording medium) on which the aforementioned program and various data are recorded in a manner that can be read by a computer (or CPU); and RAM onto which the aforementioned program may be loaded. The objectives of the present invention can be met through the computer (or CPU) reading and executing the aforementioned program from the aforementioned recording medium. The aforementioned recording medium may be a non-transitory physical medium such as a tape, disc, card, semiconductor memory, or programmable logic circuit. The aforementioned program may also be supplied to the computer via any desired transmission medium capable of transferring the program (for example, a communication network, or broadcast waves). Finally, embodiments of the invention may also be implemented in the form of data signals encapsulated in carrier waves that are realized through the electronic transmission of the aforementioned program.

The present invention is not limited to each of the above described embodiments, and may be modified in various ways and remain within the scope of the claims. The technical means disclosed in each of the different embodiments may be combined as appropriate, and an embodiment obtained in such a manner remains within the technical scope of the present invention.

Other Embodiments

Here ends the description of embodiments of the invention; the invention is not limited to the above mentioned embodiments, and may be modified in various ways insofar as the modifications do not depart from the spirit and scope of the invention.

(A)

The above described embodiments provide examples of a management device 1 managing the power generator (solar power device 3) and the appliances (power storage device 5a, water heater 5b, and refrigerator 5c) owned by a single consumer. However, the present invention is not limited to this configuration.

Figure 7:
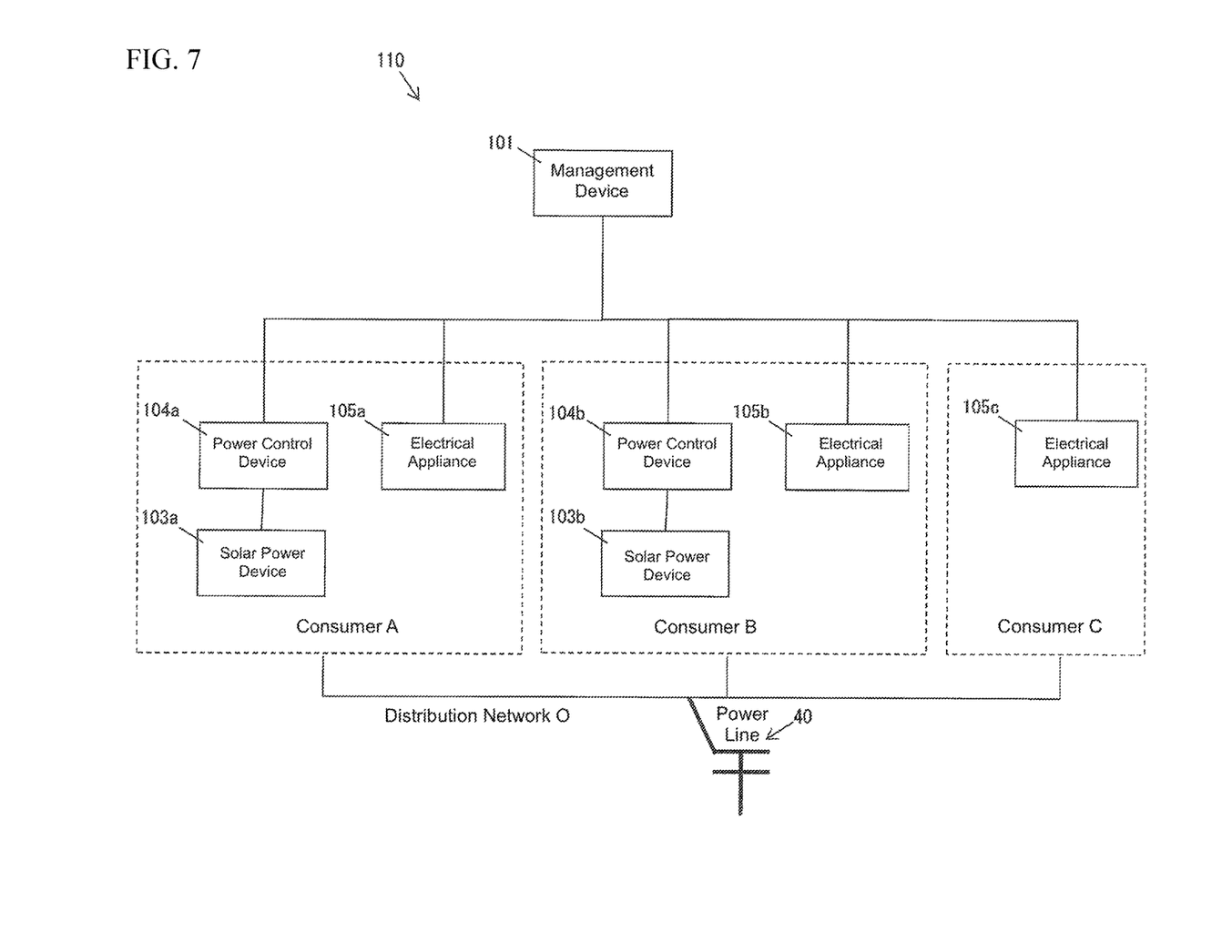
FIG. 7 is a block diagram illustration a configuration of a management system including a management device according to another embodiment of the invention.

For example, as illustrated in FIG. 7, the present invention may be implemented as a management system 110 containing a management device 101 that manages power generators 103a, 103b and/or electrical appliances 105a-105c that are scattered among a plurality of consumers, Consumers A through C.

The management device 101 possesses the same configuration as the management device 1 in the above-mentioned embodiments; that is, the management device 101 includes a controller 11, a storage unit 12, a communication unit 13, and the like.

Consumer A owns a power generator 103a, a power control device 104a, and an electrical appliance 105a. Consumer B owns a power generator 103b, a power control device 104b, and an electrical appliance 105b. Consumer C does not own a power generator and does not own a power control device, and owns only the electrical appliance 105C.

In this case, the surplus energy (and potential usable energy) may be flexibly shared among the multiple Consumers A through C connected via the shared distribution network O.

When routing surplus energy (potential usable energy) among the multiple consumers, Consumers A through C, for example, the surplus energy (potential usable energy) created at one consumer, i.e., Consumer A may be supplied to the appliances 105b, 105c owned by multiple consumers, i.e., Consumers B, C.

Moreover, when selecting the consumer that will be supplied power by a consumer that has generated surplus energy (potential usable energy), the controller 11 (i.e., the scheduler 24) preferably takes into account any power distribution loss that may occur when distributing power and selects where to supply power.

Hereby, for instance, it is possible to exclude consumers that are connected on a different distribution network that would create a large distribution power loss during power distribution, and select where to supply the surplus power (potential usable power).

Note the plurality of consumers, i.e., Consumers A through C, may own various kinds of power generators, for instance, generators that make use of natural energy such as a solar power device, wind power device, geothermal power device or the like, or may own electric generators, binary cycle power generators, or the like.

Additionally, the plurality of consumers, i.e., Consumers A through C, may own various kinds of appliances such as a power storage device, water heater, refrigerator, air conditioner (air conditioning device), electric car, illumination device, washing machine, television set, or the like.

(B)

In the above embodiments, the storage unit 12, which stores various data such as the power data 31, the voltage data 32, and the physical quantity data 33, is built into the management device 1. However, the present invention is not limited to this configuration.

The various data may be stored outside the management device on a server, in the cloud, or the like for example.

INDUSTRIAL APPLICABILITY

The present invention may be adopted in a management device that manages a power generator and an electrical appliance.

REFERENCE NUMERALS

1 Management Device
2 Power Grid
3 Solar Power Device (Power Generator)
4 Power Control Device
5a Power storage device (electrical appliance)
5b Water heater (electrical appliance)
5c Refrigerator (electrical appliance)

6a-6c, 8a Power Meter
7a Power Storage Sensor
7b, 7c Temperature Sensor
8b Voltage Meter
10 Management System
21 Data Acquisition Unit
22 Estimation Unit
23 Surplus Power Calculator
24 Scheduler
25 Appliance Controller
26 Assessment Unit
101 Management Device
103a, 103b Solar Power Device
104a, 104b Power Control Device
105a-105c Electrical Appliance
110 Management system

The invention claimed is:

1. A management device configured to manage a power generator and an electrical appliance, the management device comprising a processor configured with a program to perform operations comprising:
operation as a surplus power calculator configured to compute a measurement value or an estimated value for a surplus power which is power output from the power generator excluding the power consumption of the electrical appliance; and
operation as a scheduler configured to create an operation schedule for a designated appliance scheduled to operate during a period different from a surplus power period when the surplus power is available so that the designated appliance uses the surplus power during the surplus power period to operate, and configured to shift the operation period of the designated appliance when a potential usable power is greater than an increment in the power consumption resulting due to shifting the operation period of the designated appliance, where the potential usable power is the surplus power with a potential electric power for selling excluded therefrom.

2. The management device according to claim 1, wherein the processor is configured with the program to perform operations such that operation as the scheduler comprises operation as the scheduler that selects the power of the designated appliance to shift to minimize the value resulting from adding the electricity rate corresponding to an increment in the power consumption resulting due to the shift and the electricity rate corresponding to a feed-in loss power due to the shift after subtracting an electricity rate corresponding to the power of the designated appliance shifted from the electricity rate for purchasing energy from the power grid.

3. The management device according to claim 1, wherein the processor is configured with the program to perform operations such that operation as the scheduler comprises operation as the scheduler that selects the power of the designated appliance to shift to minimize the value resulting from adding an increment in the power consumption resulting due to the shift after subtracting the power of the designated appliance shifted from power to be purchased from the power grid.

4. The management device according to claim 1, wherein the processor is configured with the program to perform operations such that operation as the surplus power calculator comprises operation as the surplus power calculator that computes an estimated value for the surplus power during a predetermined period by subtracting an estimated value for the power consumption during the predetermined period from an estimated value for the power output during the predetermined period.

5. The management device according to claim 1, wherein the processor is configured with the program to perform operations such that operation as the surplus power calculator comprises operation as the surplus power calculator that computes a measurement value for the surplus power by subtracting a measurement value for the power consumption from a measurement value for the power output.

6. The management device according to claim 4, wherein:
the processor is configured with the program to perform operations further comprising operation as a data acquisition unit configured to acquire power data from a meter, the power data representing a measurement value for at least any of the power output and the power consumption; and
the processor is configured with the program to perform operations such that operation as the surplus power calculator comprises operation as the surplus power calculator that updates the estimated value for the surplus power during the predetermined period on the basis of the power data.

7. The management device according to claim 1, wherein the designated appliance comprises a plurality of designated appliances;
the processor is configured with the program to perform operations further comprising managing the plurality of designated appliances and establish priorities for the plurality of designated appliances; and
the processor is configured with the program to perform operations such that operation as the scheduler comprises operation as the scheduler that determines the operation schedule so that each of the plurality of designated appliances use the surplus power in descending order of a respective one of the established priorities.

8. The management device according to claim 1, wherein the operation schedule comprises at least an operation start time for the designated appliance.

9. The management device according to claim 8, wherein the operation schedule further comprises an operation period for the designated appliance.

10. The management device according to claim 1, wherein the processor is configured with the program to perform operations further comprising operation as an appliance controller configured to operate the designated appliance on the basis of the operation schedule.

11. The management device according to claim 1, wherein the processor is configured with the program to perform operations further comprising managing at least one of the power generator and the electrical appliance, and
the power generator and the electrical appliance are owned by different ones of a plurality of consumers.

12. The management device according to claim 11, wherein the processor is configured with the program to perform operations such that operation as the scheduler comprises operation as the scheduler that determines which of the designated appliances in the plurality of electrical appliances is to receive the potential usable power.

13. The management device according to claim 11, wherein the processor is configured with the program to perform operations such that operation as the scheduler comprises operation as the scheduler that selects the designated appliances whose operation period is to be shifted taking into account a distribution loss that occurs when power is distributed via a distribution network interconnecting the plurality of consumers.

14. A management system comprising:
a management device according to claim 1;
the power generator; and
the electrical appliance.

15. A control method for a management device configured to manage a power generator and an electrical appliance, the control method comprising:
computing a measurement value or an estimated value for a surplus power which is power output from the power generator excluding the power consumption of the electrical appliance; and
creating an operation schedule for a designated appliance scheduled to operate during a period different from a surplus power period when the surplus power is available so that the designated appliance uses the surplus power during the surplus power period to operate, and shifting the operation period of the designated appliance when a potential usable power is greater than an increment in the power consumption resulting due to shifting the operation period of the designated appliance, where the potential usable power is the surplus power with a potential electric power for selling excluded therefrom.

16. A non-transitory computer-readable recording medium storing a control program for causing a computer to perform operations comprising operations to function as a management device according to claim 1, the control program further causing the computer to perform operations comprising: operation as the surplus power calculator and operation as the scheduler.

* * * * *